United States Patent [19]
Duvall

[11] 3,738,593
[45] June 12, 1973

[54] SECTOR DEFENSE SYSTEM
[75] Inventor: Francis W. Duvall, Huntsville, Ala.
[73] Assignee: The United States of America as represented by the Secretary of the Army, Washington, D.C.
[22] Filed: July 16, 1971
[21] Appl. No.: 163,491

[52] U.S. Cl. .............................. 244/3.14, 343/6.5 R
[51] Int. Cl. ............................................... F41g 7/00
[58] Field of Search ..................... 343/6.5 R, 6.5 L, 343/6.5 C, 6, 7 ED, 15; 244/3.14, 3.16

[56] References Cited
UNITED STATES PATENTS

| | | | |
|---|---|---|---|
| 3,296,615 | 1/1967 | Page et al. | 343/6.5 R |
| 3,286,955 | 11/1966 | French et al. | 343/7 ED |
| 3,560,971 | 2/1971 | Alsberg et al. | 343/7 ED |
| 3,427,611 | 2/1969 | Enenstein | 343/6 R |
| 2,891,246 | 6/1959 | Reed, Jr. | 343/6.5 R |
| 3,197,775 | 7/1965 | Sendler | 343/15 |
| 3,064,929 | 11/1962 | Gard | 343/15 |

OTHER PUBLICATIONS
Drewry, Jr, Army, Feb. 1964 pages 52–55 "The Brand Name is Nike X."

Primary Examiner—Benjamin A. Borchelt
Assistant Examiner—Harold Tudor
Attorney—Harry M. Saragovitz, Edward J. Kelly, Herbert Berl et al.

[57] ABSTRACT

A system for defense of a sector of terrain having targets therein disposed to emit rays including friendly targets disposed to transmit IFF signals and hostile targets. The system includes a monitor for sweeping the atmosphere of the sector with rays for reflection from targets and stations for receiving the emitted rays and the reflection for computation of triangulation and doppler information and the IFF signals and for transmitting appropriate signals for monitor selection of and transmission to the launchers of signals for firing the corresponding missiles to intercept the hostile targets.

3 Claims, 2 Drawing Figures

Patented June 12, 1973

3,738,593

Francis W. DuVall,
INVENTOR.

BY *Harry M. Saragovitz*
*Edward J. Kelly*
*Herbert Berl*
*William P. Murphy*

SECTOR DEFENSE SYSTEM

CROSS-REFERENCE TO RELATED APPLICATIONS

U.S. Pat. No. 3,286,955 is concerned with apparatus for command control of missiles after launch.

SUMMARY OF THE INVENTION

In carrying out my invention a monitor is provided at the apex of a terrain sector and arrays of missile launchers and receiving stations respectively disposed across the sector at predetermined distances from the monitor.

The monitor is disposed to continuously sweep the sector with rays for reflection from friendly targets with IFF transmission capability and from hostile targets.

The stations receive from the targets emitted rays including the IFF signals, generate doppler and triangulation information of the targets responsive to the reflections and transmit appropriate IFF, doppler, and triangulation signals to the monitor for transmission of firing signals to each of the appropriate missile launchers as the hostile targets enter the ranges of the corresponding missiles.

DESCRIPTION OF THE PREFERRED EMBODIMENT

Figure 1:
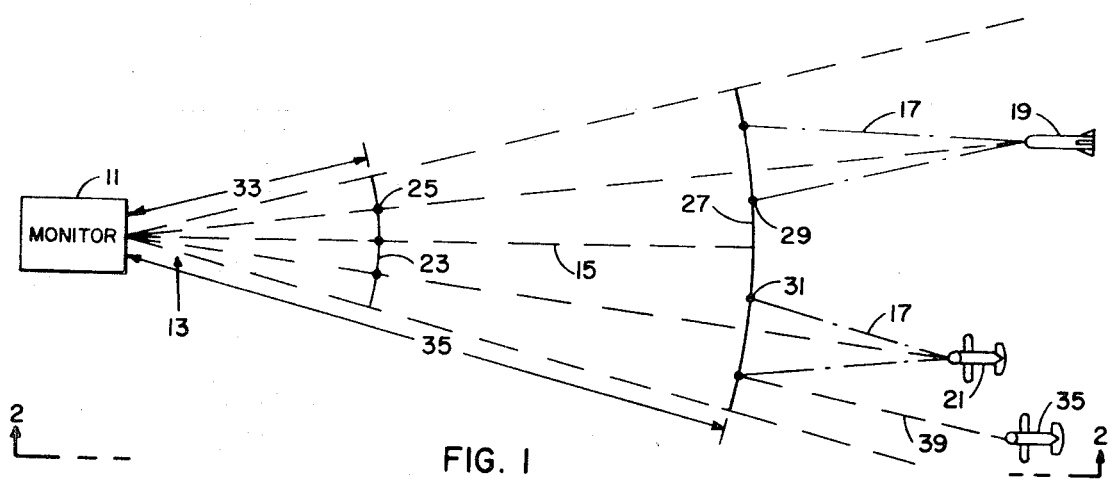
FIG. 1 is a plan view of a sector of terrain with targets therein. A monitor is positioned at the apex of the sector and missile launchers and receiving stations are disposed in arrays across the sector respectively forward from the apex.
Figure 2:
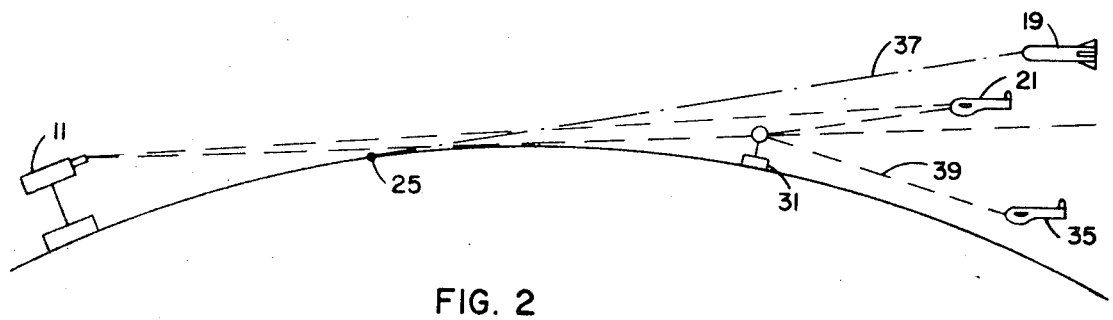
FIG. 2 is a view along 2—2 of FIG. 1.

A monitor 11 is disposed at the apex of a sector 13 to sweep the atmosphere thereof with rays 15 for reflection 17 from targets 19 and 21 within sector 13. Spaced array 23 with missile launchers 25 and spaced array 27 with stations 29 and 31 are spaced forwardly at predetermined distances 33 and 35 from monitor 11 with stations 29 and 31 in atmospheric spaced relation with monitor 11.

Stations 29 and 31 are disposed for active excitation by reflected rays 17 from targets 19 and 21 and for passive excitation by emitted rays 39 from targets 19, 21 and 35 for generation of triangulation and doppler information of the targets responsive to the rays, and for transmission or appropriate signals to monitor 11.

Targets 21 such as friendly aircraft are disposed to transmit IFF signals and when such signals are received by stations 29 and 31 along the same lines as either the emitted rays 39 or reflected rays 17, the IFF signals are simultaneously transmitted to monitor 11 for discrimination of the friendly targets from the hostile targets.

Monitors 11 are disposed to select and send firing signals to appropriate launchers 25 for homing of missiles thereof on emitted rays 39 from the hostile targets and the rays 17 reflected therefrom. Interception of the targets by the missiles may occur even before the targets come within the lines of sight 37 from launchers 25.

I claim:

1. A system for defense of a sector of terrain having therein friendly and hostile targets disposed for emitting rays and with the friendly targets additionally disposed for transmitting IFF signals, comprising:
   a. a monitor and stations for receiving rays and IFF signals from the targets disposed in atmospheric spaced relation with said monitor; and
   b. launchers for supporting missiles thereon;
   c. said receiving stations being disposed to generate triangulation and doppler information regarding the targets and to transmit the IFF signals and signals including the doppler and IFF information to said monitor, and said monitor being disposed for appropriate selection of said launchers and for transmission thereto of firing signals as the hostile targets approach the ranges of the corresponding missiles.

2. A defense system as in claim 1, with
   a. said monitor disposed at the apex of the sector to sweep the volume thereof with rays for reflection from the friendly and hostile targets; and
   b. said launchers and said receiving stations disposed in respective arrays across the sector at predetermined distances from said monitor.

3. A defense stystem as in claim 2 with said receiving stations disposed at points beyond the lines of sight from said launchers.

* * * * *